(12) United States Patent
Shioya et al.

(10) Patent No.: US 10,232,604 B2
(45) Date of Patent: Mar. 19, 2019

(54) MANUFACTURING METHOD OF METAL MEMBER

(71) Applicant: TOYOTA JIDOSHA KABUSHIKI KAISHA, Toyota-shi (JP)

(72) Inventors: Shigemi Shioya, Okazaki (JP); Atsushi Muramatsu, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 199 days.

(21) Appl. No.: 15/258,164

(22) Filed: Sep. 7, 2016

(65) Prior Publication Data

US 2017/0066083 A1 Mar. 9, 2017

(30) Foreign Application Priority Data

Sep. 9, 2015 (JP) .................................. 2015-177814

(51) Int. Cl.
*B29C 67/00* (2017.01)
*B33Y 40/00* (2015.01)
*B33Y 10/00* (2015.01)

(52) U.S. Cl.
CPC ............... *B33Y 40/00* (2014.12); *B33Y 10/00* (2014.12)

(58) Field of Classification Search
CPC ......... B33Y 10/00; B33Y 30/00; B33Y 50/02; B33Y 40/00; B33Y 80/00; B33Y 70/00; B22F 2999/00; B22F 3/008; B22F 3/1055; B22F 3/1021; B22F 2003/1058; B22F 2998/10; B22F 2003/247; B22F 3/24; B22F 5/04; B22F 2003/1056; B22F 2007/042; B28B 1/001; B29C 64/393; B29C 64/40; B29C 64/153; B29C 64/10; B29C 64/20
See application file for complete search history.

(56) References Cited

U.S. PATENT DOCUMENTS

| | | | | |
|---|---|---|---|---|
| 2014/0300017 | A1* | 10/2014 | Wighton | B29C 67/0092 264/40.1 |
| 2015/0066178 | A1* | 3/2015 | Stava | B29C 67/0088 700/98 |
| 2015/0360421 | A1* | 12/2015 | Burhop | G05B 19/4099 264/401 |
| 2016/0229127 | A1* | 8/2016 | Halliday | B29C 67/0092 |
| 2017/0120515 | A1* | 5/2017 | Rolland | B33Y 10/00 |

FOREIGN PATENT DOCUMENTS

JP 8-25487 1/1996

* cited by examiner

*Primary Examiner* — Jun S Yoo
(74) *Attorney, Agent, or Firm* — Oblon, McClelland, Maier & Neustadt, L.L.P.

(57) ABSTRACT

In a manufacturing method of a metal member according to an embodiment, the metal member having an overhang portion is molded together with hollow support members that support the overhang portion, by repeatedly forming a molding layer that is selectively melted and solidified by applying a light beam to a predetermined region of a metal powder layer spread over a pedestal. The manufacturing method includes: providing removal members on the pedestal; integrally forming the support members on the removal members; integrally forming the metal member on the support members; and removing the removal members and the support members, by twisting the removal members, from the removal members, the support members, and the metal member that are formed integrally with each other.

13 Claims, 15 Drawing Sheets

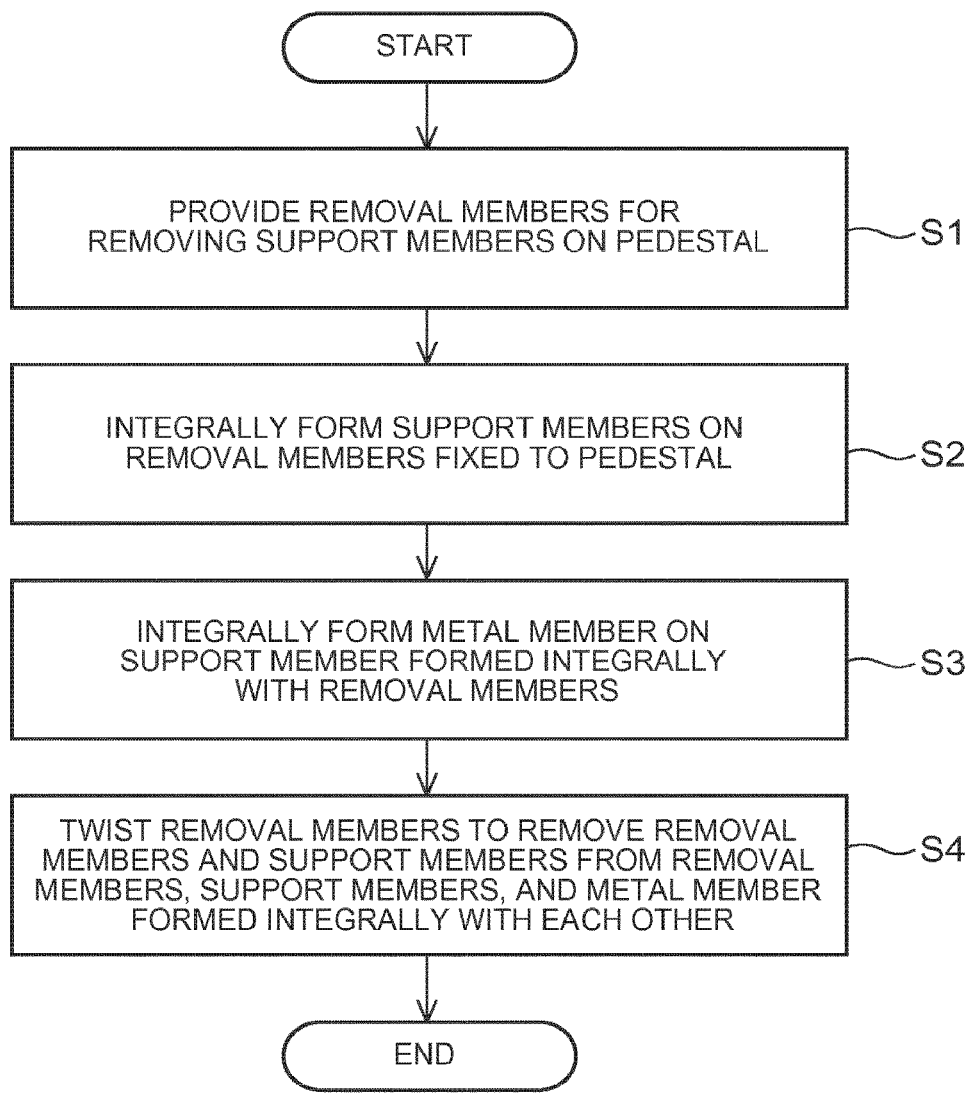

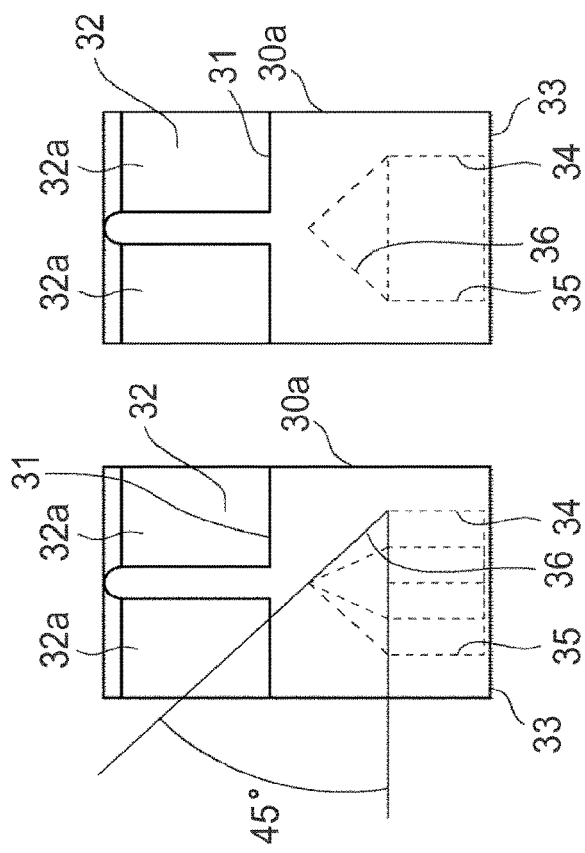

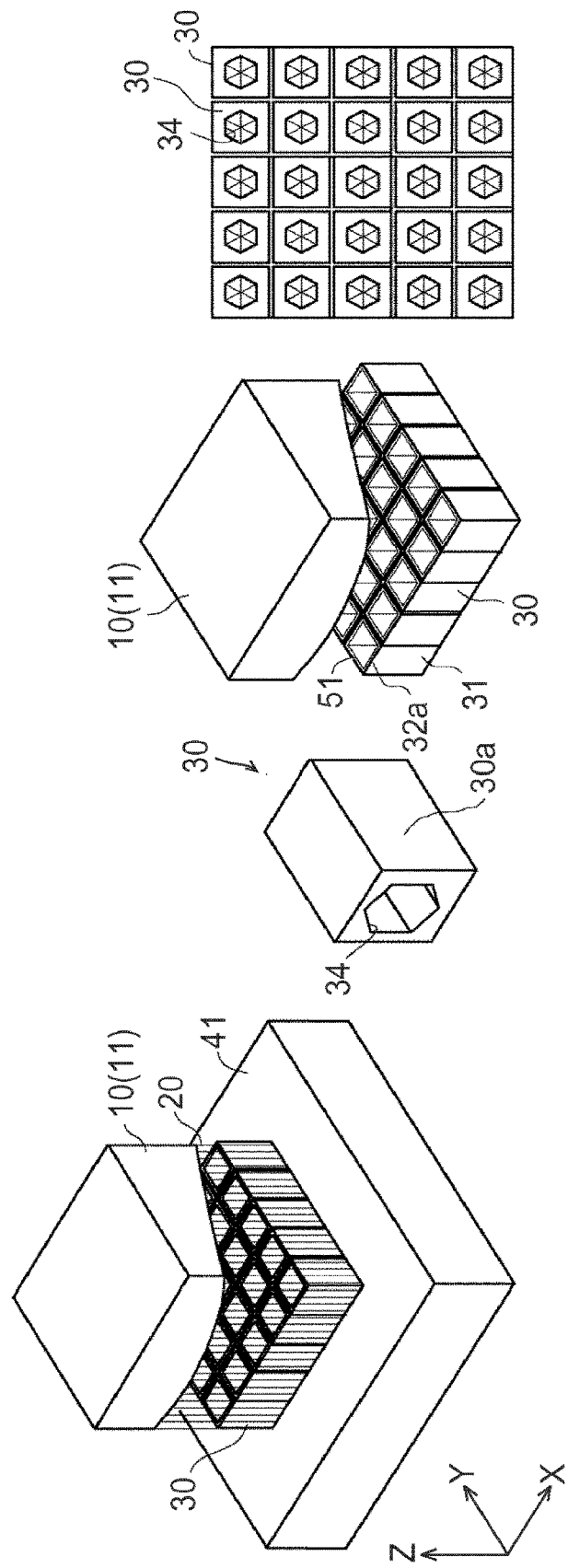

MANUFACTURING METHOD OF METAL MEMBER

INCORPORATION BY REFERENCE

The disclosure of Japanese Patent Application No. 2015-177814 filed on Sep. 9, 2015 including the specification, drawings and abstract is incorporated herein by reference in its entirety.

BACKGROUND OF THE INVENTION

1. Field of the Invention

The present invention relates to a manufacturing method of a metal member, and relates to a manufacturing method of a metal member by use of a three-dimensional molding device, which is a so-called 3D printer, for example.

2. Description of Related Art

A three-dimensional molding device, a so-called 3D printer, comes into the limelight. The three-dimensional molding device molds a member having a three-dimensional shape by applying a light beam to a material such as metal powder or photocurable resin. More specifically, by repeatedly forming a molding layer selectively melted and solidified or cured by applying a light beam to a predetermined region of a material layer, it is possible to manufacture a three-dimensional shaped member in which many molding layers are laminated and integrated.

In a case where a member having an overhang portion is manufactured by use of such a three-dimensional molding device, it is necessary to separate and remove support members after a member as a product is molded together with the support members that support the overhang portion. The support member has a hollow honeycomb structure, which facilitates a removal operation. However, the removal operation of the support members is often performed manually, which takes time. In view of this, a technique to further facilitate the removal operation of the support members and shorten time has been explored.

Japanese Patent Application Publication No. 8-025487 (JP 8-025487 A) describes a support formation method in which a gap is provided between a support member and a resin member so as to facilitate a removal operation of the support member in the resin member molded by a three-dimensional molding device.

In a case where the method described in JP 8-025487 A is applied to molding of a metal member, such a problem may be caused that the metal member is inclined during the molding due to a gap between the support member and the metal member, because the metal member is heavier than the resin member.

Accordingly, the method described in JP 8-025487 A cannot be applied to the manufacturing method of the metal member. The exploring of the technique to facilitate the removal operation of the support members in the manufacturing method of the metal member so as to shorten time still continues.

SUMMARY OF THE INVENTION

The present invention provides a manufacturing method of a metal member. In the manufacturing method, removal members, support members, and a metal member are molded integrally, and by twisting the removal members, it is possible to easily separate and remove the removal members and the support members from the removal members, the support members, and the metal member thus molded integrally.

A manufacturing method of a metal member according to one aspect of the present invention is a manufacturing method for manufacturing a metal member such that the metal member having an overhang portion is molded together with hollow support members that support the overhang portion, by repeatedly forming a molded layer selectively melted and solidified by applying a light beam to a predetermined region of a metal powder layer spread over a pedestal. The manufacturing method includes: a step of providing removal members on the pedestal, the removal members being used for removing the support members; a step of integrally forming the support members on the removal members provided on the pedestal; a step of integrally forming the metal member on the support members formed integrally with the removal members; and a step of removing the removal members and the support members, by twisting the removal members, from the removal members, the support members, and the metal member that are formed integrally with each other. The removal members each include a body portion as a columnar solid member, a uneven structure formed on a bottom face or a side face of the body portion, and a wing portion formed so as to project toward a vertically upper side from a top face of the body portion, and in the step of removing the support members, a torsional force applied to the removal member from outside through the uneven structure is transmitted to a side face of the support member from a side face of the wing portion. With such a configuration, by twisting the removal members, it is possible to easily separate and remove the removal members and the support members.

In the step of integrally forming the support members, the support members may be formed as hollow rectangular columns extending toward the vertically upper side, and a plurality of support members may be formed integrally and arranged so as to form a square honeycomb structure. Such a configuration allows the support members to have rigidity and to hold the metal member. In the meantime, it is possible to easily remove the support members.

Further, in the step of providing the removal members on the pedestal, a plurality of removal members may be provided, and in the step of removing the support members, the removal members placed in an outer periphery may be twisted sequentially along the outer periphery, when the plurality of removal members is viewed from a vertically lower side. With such a configuration, it is possible to decrease the torsional force.

The manufacturing method may further include a step of forming the support members on the pedestal before the step of providing the removal members on the pedestal, and in the step of providing the removal members on the pedestal, the removal members may be formed on the support members formed on the pedestal. Such a configuration facilitates separation of the removal members, the support members, and the metal member that are formed integrally with each other from the pedestal.

Further, the removal member may have a cylindrical shape, the wing portion may be constituted by a plurality of plate-shaped bodies having a width of the same length as a radius of the top face and having a predetermined height and a predetermined thickness, and one ends of the plate-shaped bodies may be placed on a center of the top face so that the plate-shaped bodies are arranged radially, when viewed from the vertically upper side. With such a configuration, it is possible to increase a bonding force between the support member and the wing portion, thereby making it possible to transmit the torsional force from the uneven structure to the support member.

Further, the uneven structure may be a projection portion formed on the bottom face of the body portion.

Further, in the step of providing the removal members on the pedestal, the body portions of the removal members formed in advance may be embedded and fixed in a groove formed in the pedestal, and in the step of integrally forming the support members, the support members may be formed integrally with the wing portions. With such a configuration, it is possible to omit an operation of removing the removal members from the pedestal by use of a band saw.

The body portion of the removal member may have a cylindrical shape, the wing portion may be constituted by one plate-shaped body having a width of the same length as a diameter of the top face and having a predetermined height and a predetermined thickness, and the plate-shaped body may be placed along one direction passing through a center of the top face.

The uneven structure may be a recessed portion formed on the side face of the body portion.

The body portion of the removal member may have a square-column shape, the wing portion may be constituted by a plurality of plate-shaped bodies having a width of the same length as half of one side of a square top face of the body portion and having a predetermined height and a predetermined thickness, one ends of the plate-shaped bodies may be placed on a center of the top face so that the plate-shaped bodies are arranged radially, when viewed from the vertically upper side, the plate-shaped bodies may be placed such that an angle formed between adjacent plate-shaped bodies is 90°, a plurality of removal members may be arranged in a matrix form, and the removal members may be arranged diagonally relative to edges of the metal member, when viewed from the vertically lower side.

The body portion of the removal member may have a square-column shape, the wing portion may be constituted by four plate-shaped bodies having a width of the same length as one side of a square top face of the body portion and having a predetermined height and a predetermined thickness, and the four plate-shaped bodies may be connected along edges of the top face of the body portion in a box shape.

The body portion of the removal member may have a shape of a hexagonal column, in the hexagonal column, a corner part formed between adjacent side faces of the body portion may be formed in a round shape, and the removal members may be arranged such that each of six side faces of the body portion is opposed to a side face of a corresponding one of body portions adjacent to the body portion.

A recessed portion may be formed on the bottom face of the body portion of the removal member.

According to the present invention, it is possible to provide a manufacturing method of a metal member, the manufacturing method attaining easy separation and removal of removal members and support members by twisting the removal members.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a flow chart exemplifying the manufacturing method of the metal member according to the embodiment;

FIG. 3A is a perspective view exemplifying the removal member in the manufacturing method of the metal member according to the embodiment;

FIG. 3B is a top view exemplifying the removal member in the manufacturing method of the metal member according to the embodiment;

FIG. 3C is a front view exemplifying the removal member in the manufacturing method of the metal member according to the embodiment;

FIG. 3D is a side view exemplifying the removal member in the manufacturing method of the metal member according to the embodiment;

FIG. 14A is a perspective view exemplifying removal members, support members, and a metal member according to Modification 8 of the embodiment;

FIG. 14B is a perspective view exemplifying the removal member according to Modification 8 of the embodiment;

FIG. 14C is a perspective view exemplifying the removal members and the metal member according to Modification 8 of the embodiment;

FIG. 14D is a view of the removal member separated from a pedestal and viewed from a vertically lower side, according to Modification 8 of the embodiment.

DETAILED DESCRIPTION OF EMBODIMENTS

The following describes a best mode for carrying out the present invention with reference to the attached drawings. However, the present invention is not limited to the following embodiment. Further, the following description and drawings are simplified appropriately for clarification of the description.

A manufacturing method of a metal member according to the embodiment is described. The manufacturing method of the metal member of the present embodiment is a manufacturing method for manufacturing a metal member of a shape having an overhang portion in a three-dimensional molding device (3D printer).

Figure 1:
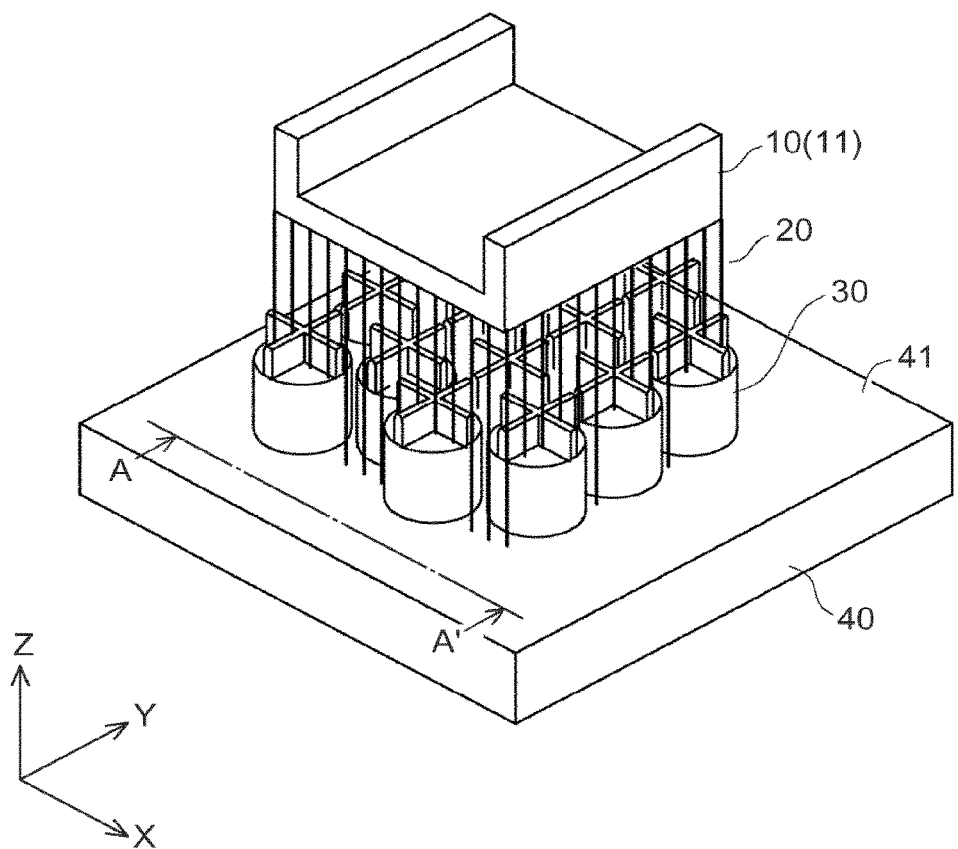
FIG. 1 is a perspective view exemplifying removal members, support members, and a metal member in a manufacturing method of a metal member according to an embodiment.

FIG. 1 is a perspective view exemplifying removal members, support members, and a metal member in the manufacturing method of the metal member according to the embodiment. FIG. 2 is a flow chart exemplifying the manufacturing method of the metal member according to the embodiment.

As illustrated in FIG. 1, in the present embodiment, in a manufacturing process of a metal member 10, support members 20 are formed so as to support an overhang portion 11 in the metal member 10. Note that, In FIG. 1, only the overhang portion 11 in the metal member 10 is illustrated, and the other parts of the metal member 10 are omitted. Further, removal members 30 for removing the support members 20 when the finished metal member 10 is taken out are formed. The manufacturing method of the metal member 10 according to the embodiment will be described separately in terms of a formation method (steps S1 to S3 in FIG. 2) of the metal member 10, the support members 20, and the removal members 30, and a removal method (step S4 in FIG. 2) of the support members 20 and the removal members 30. First will be described the formation method of the metal member 10, the support members 20, and the removal members 30.

As illustrated in FIG. 1, a pedestal 40 is prepared. The pedestal 40 has a plate shape, for example. A top face 41 of the pedestal 40 is level. In FIG. 1, an XYZ rectangular coordinate system is introduced for purposes of this description. A Z-direction is a vertical direction and is a direction perpendicular to the top face 41 of the pedestal 40. An X-direction and a Y-direction are a horizontal direction and are directions parallel to the top face 41 of the pedestal 40.

Then, metal powder is spread over the pedestal 40 in a layer form. The metal powder is, for example, maraging steel, Inconel 718, or the like. The metal powder is spread closely and thinly in a layer form having a thickness of 0.04 mm, for example, by use of a recoater. Then, a light beam is applied to a predetermined region of a metal powder layer thus spread over the pedestal 40, so as to form a molding layer that is selectively melted and solidified. In the molding layer thus melted and solidified, a sectional shape of at least one member out of the metal member 10, the support members 20, and the removal members 30 is formed. Unsintered metal powder remains in a part that is not melted and solidified. In a part to be melted and solidified, a three-dimensional molding device is controlled by use of a STL-type 3D data for sintering.

Subsequently, metal powder is spread over the formed molding layer and the unsintered metal powder. Then, a light beam is applied to a predetermined region so as to form a molding layer. As such, spreading of the metal powder and the application of a light beam are repeated, so as to laminate the molding layers. The molding layers are piled upward in a unit of a dozens of microns. By piling up the molding layers to a predetermined height, the removal members 30 are formed on the pedestal 40 together with a part of the metal member 10 or the support members 20. Thus, as illustrated in step S1 of FIG. 2, the removal members 30 for removing the support members 20 are provided on the pedestal 40.

In the present embodiment, the removal members 30 are made of the same metal powder layer as the support members 20 and the metal member 10. Accordingly, the removal members 30, the support members 20, and the metal member 10 can be formed continuously and integrally with each other. At this time, 3D data for sintering includes data of the removal members 30.

FIGS. 3A to 3D are views exemplifying the removal member in the manufacturing method of the metal member according to the embodiment. FIG. 3A is a perspective view, FIG. 3B is a top view, FIG. 3C is a front view, and FIG. 3D is a side view.

As illustrated in FIG. 1 and FIGS. 3A to 3D, the removal member 30 is formed on the pedestal 40. A vertical relationship is described based on a state where the removal members 30 are formed on the top face 41 of the pedestal 40. Accordingly, FIG. 3A is a perspective view of the removal member 30 when viewed from a vertical lower side.

The removal member 30 includes a body portion 30a, which is a columnar solid member. The body portion 30a of the removal member 30 has a cylindrical shape, for example.

The removal member 30 includes a wing portion 32 formed so as to project upward in a vertical direction from a part of a top face 31 of the cylindrical body portion 30a. The wing portion 32 is constituted by a plurality of, e.g., four plate-shaped bodies 32a having a width of the same length as a radius of the top face 31 and having a predetermined height and a predetermined thickness. One ends of the plate-shaped bodies 32a are placed on a center 31a of the top face 31 so that the plate-shaped bodies 32a are arranged radially, that is, in a cross shape when viewed from a vertically upper side. Further, the plate-shaped bodies 32a are placed so that an angle formed between adjacent plate-shaped bodies 32a is equally 90°. Note that the angles between adjacent plate-shaped bodies 32a may not be equal to each other.

The removal member 30 has a uneven structure formed on a bottom face 33 of the body portion 30a. For example, the uneven structure is a recessed portion 34. When the recessed portion 34 is viewed from a vertically lower side, a shape of the recessed portion 34 is a hexagonal shape. An inner surface of the recessed portion 34 is constituted by an inner side surface 35 and a ceiling surface 36. The inner side surface 35 is formed between the bottom face 33 and the ceiling surface 36. An angle formed between the inner side surface 35 and a horizontal plane is 90°. An angle formed between the ceiling surface 36 and the horizontal plane is 45° or more. If the inner surface of the recessed portion 34 has an angle of 45° or more with respect to the horizontal plane, it is not necessary to form the support member 20 for supporting the inner surface of the recessed portion 34. Conversely, if the angle with respect to the horizontal plane is less than 45° and there is a part projecting in the air, the part must be supported by the support member 20.

A plurality of removal members 30 is formed on the pedestal 40 in a state where their bottom faces 33 face downward. When many support members 20 are attached to one removal member 30, a torsional force necessary to twist the removal member 30 increases. Accordingly, the plurality of removal members 30 is formed so as to prevent an increase in the number of support members 20 to be attached to one removal member 30. This makes it possible to lower a force necessary to twist the removal member 30.

A sectional area of the removal member 30 along a horizontal direction is preferably around 0.8 to 2.5 cm². The removal members 30 are placed at positions where they do not adhere to each other. Note that the recessed portion 34 may be formed as a minus-shaped hole, a plus-shaped hole, or a torx-shaped (registered trademark) (star-shaped) hole, instead of a hexagonal hole.

The wing portion 32 preferably has a shape that allows a torsional force applied to the removal member 30 via the uneven structure to be transmitted to a side face of the support member 20 from a side face of the wing portion 32. The wing portion 32 preferably has a shape having a large contact area with the support member 20 in a direction perpendicular to a direction of the torsional force. As such, if the wing portion 32 has a shape that allows the torsional force to be transmitted to the side face of the support member 20 from the side face of the wing portion 32, the wing portion 32 may have a uneven shape, a hole shape, a wing shape, or the like instead of the plate-shaped body 32a.

Subsequently, metal powder is spread over the pedestal 40 in a layer form, and then, a light beam is applied to a predetermined region of a metal powder layer thus formed, so as to form a molding layer that is selectively melted and solidified. This operation is repeated, so as to laminate molding layers. Hereby, the support members 20 are formed together with part of the metal member 10. As such, as illustrated in step S2 of FIG. 2, the support members 20 are integrally formed on the removal members 30 provided on the pedestal 40.

Figure 4A:
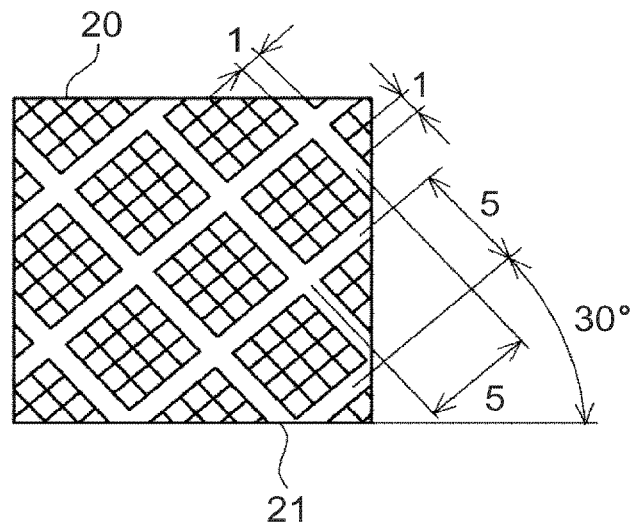
FIG. 4A is a horizontal sectional view exemplifying the support members in the manufacturing method of the metal member according to the embodiment.
Figure 4B:
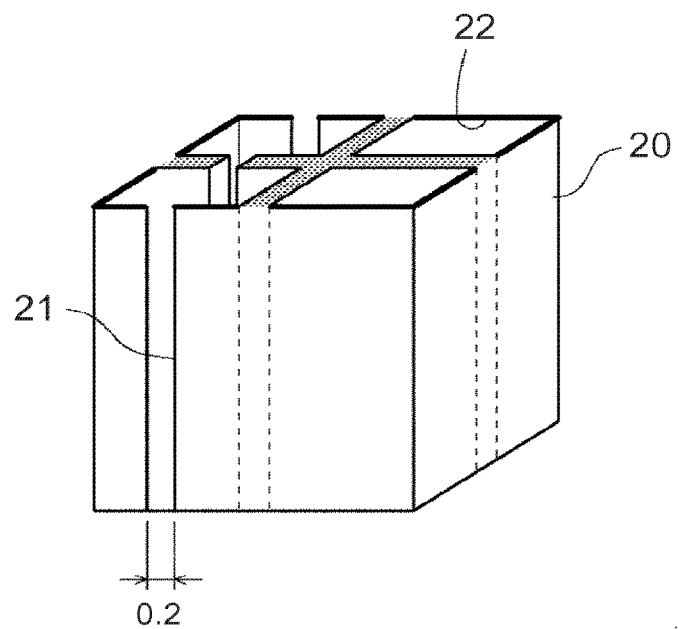
FIG. 4B is a perspective view exemplifying the support member in the manufacturing method of the metal member according to the embodiment.

FIG. 4A is a horizontal sectional view exemplifying the support members in the manufacturing method of the metal member according to the embodiment, and FIG. 4B is a perspective view exemplifying the support members in the manufacturing method of the metal member according to the embodiment.

As illustrated in FIGS. 1, 4A, and 4B, when the support members 20 are formed integrally, for example, the support member 20 is formed as a hollow rectangular column extending toward the vertically upper side, and a plurality of support members 20 is arranged in an integrated manner so as to have a square honeycomb structure. Since the support members 20 are formed to have the square honeycomb structure, the support members 20 can have rigidity to hold the metal member 10. In the meantime, the support members 20 can be easily removed. The support member 20 has a cell structure in which rectangular columns having a square section with one side of 1 mm and having a wall thickness of 0.15 mm are collectively provided without any gap. In FIG. 1, the support members 20 are illustrated schematically.

When viewed from the vertically upper side, a penetration groove 21, called a fragment, is formed every 5 mm in two perpendicular directions along which the rectangular columns are arranged in the square honeycomb structure. For example, a width of the penetration groove 21 is 0.2 mm. Due to the penetration grooves 21, the support members 20 are formed in a grid shape at intervals of 5 mm when viewed from the vertically upper side. When viewed from the vertically upper side, 4×4 support members 20 are placed in one grid. The penetration grooves 21 are penetrated through the support members 20 from upper ends to bottom ends thereof. Due to the penetration grooves 21, the support members 20 cannot be easily removed. A hollow of the rectangular column is filled with the metal powder remaining in an unsintered state. As described above, as the number of support members 20 connected to the removal member 30 is smaller, a torsional force to twist the removal member 30 can be made small. However, in that case, the number of removal members 30 increases, which increases the number of times of twisting. The number of support members 20 to be connected to one removal member 30 is set to an appropriate number.

Subsequently, metal powder is spread over the pedestal 40, and then, a light beam is applied to a predetermined region of a metal powder layer thus formed, so as to form a molding layer that is selectively melted and solidified. This operation is repeated, so as to laminate molding layers. Hereby, the metal member 10 is formed. That is, by repeatedly forming a molding layer that is selectively melted and solidified by applying a light beam to a predetermined region of a metal powder layer spread over the pedestal 40, the metal member 10 having the overhang portion 11 is molded together with the hollow support members 20 that support the overhang portion 11. As such, as illustrated in step S3 in FIG. 2, the metal member 10 is integrally formed on the support members 20 formed integrally with the removal members 30. Hereby, a structure illustrated in FIG. 1 is formed.

Next will be described the removal method of the support members 20 and the removal members 30 in the manufacturing method of the metal member 10. For example, a band saw (flat saw) is placed along a line A-A' illustrated in FIG. 1. Then, the band saw is moved along the top face 41 of the pedestal 40. Hereby, the metal member 10, the support members 20, and the removal members 30 that are formed integrally with each other are separated from the pedestal 40.

Figure 5A:
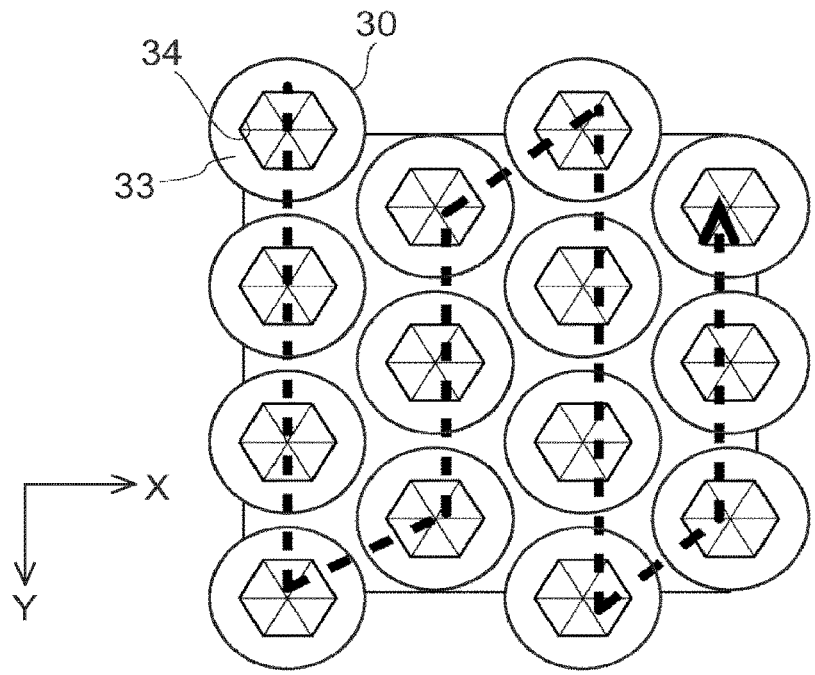
FIG. 5A is a view of the removal members separated from a pedestal and viewed from a vertically lower side, in the manufacturing method of the metal member according to the embodiment.
Figure 5B:
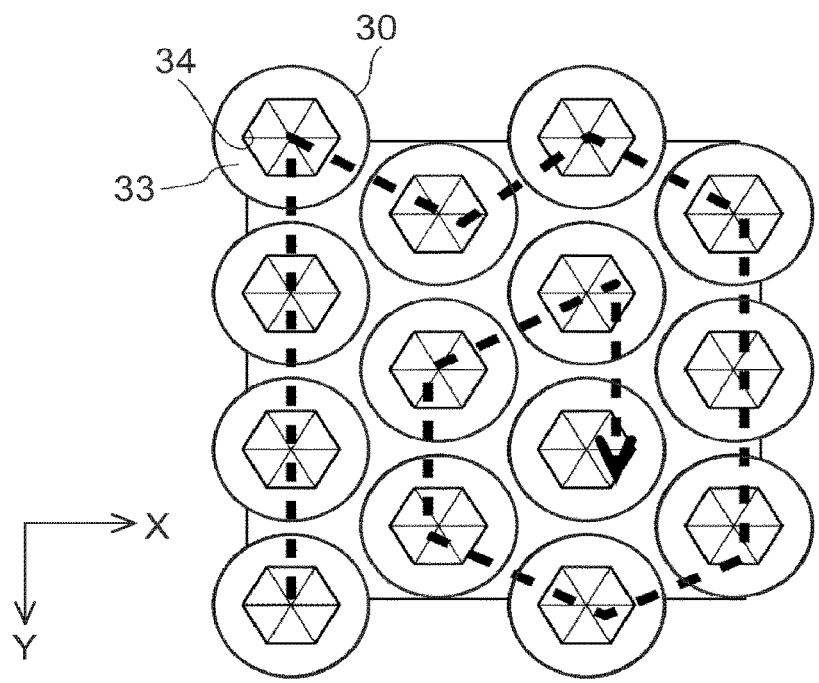
FIG. 5B is a view of the removal members separated from the pedestal and viewed from the vertically lower side, in the manufacturing method of the metal member according to the embodiment.

FIGS. 5A and 5B are views of the removal members separated from the pedestal, when viewed from the vertically lower side, in the manufacturing method of the metal member according to the embodiment. As illustrated in FIGS. 5A and 5B, when the metal member 10, the support members 20, and the removal member 30 separated from the pedestal 40 are viewed from the vertically lower side, the recessed portions 34 appear on the bottom faces 33 of the removal members 30. Note that, after they are separated from the pedestal 40, the metal powder remains in the recessed portions 34, so the metal power is removed.

Then, as illustrated in step S4 of FIG. 2, the removal members 30 are twisted so as to remove the removal members 30 and the support members 20 from the removal members 30, the support members 20, and the metal member 10 that are formed integrally with each other. The torsional force applied to the removal member 30 from outside through the uneven structure of the removal member 30 is transmitted to the side faces of the support members 20 from the side face of the wing portion 32. Hereby, the support members 20 are removed.

More specifically, a hexagonal wrench is inserted into the hexagonal recessed portion 34 (the uneven structure) formed on the bottom face of the removal member 30. The removal member 30 is then twisted by twisting the hexagonal wrench. This accordingly twits the wing portion 32. As a result, the torsional force is transmitted to the support members 20. Hereby, the support members 20 are removed.

As illustrated in FIG. 5A, when a plurality of removal members 30 is viewed from the vertically lower side, three bottom faces 33 adjacent to each other are arranged so as to be placed at three corners of an equilateral triangle. That is, the bottom faces 33 are arranged in a direction along a Y-axis and in a direction inclined by 30° from an X-axis. The removal members 30 are twisted and removed in an order that achieves a shortest distance by drawing with a single stroke of the brush.

At the time of twisting and removing the support members 20, it is preferable that the removal members 30 placed on an outer periphery be sequentially twisted along the outer periphery when the plurality of removal members 30 is viewed from the vertically lower side, as illustrated in FIG. 5B. The removal members 30 at corner parts can be removed at a small torsional force to remove the removal members 30. At the corner parts, a contact area between the side faces of the removal members 30 is small, so the torsional force can be made small. Therefore, the removal members 30 placed at the corner parts are easily removed. By removing the removal members 30 in a spiral shape along the outer periphery, occurrence numbers of the removal members 30 placed at the corner parts are increased. Hereby, it is possible to decrease the torsional force at the time of removing all the removal members 30 from an integrally molded product. On the other hand, in a case where the removal members 30 are removed from the removal member 30 placed in a central part, bonding forces between adjacent removal members 30 and between adjacent support members 20 are large. Therefore, a large torsional force is required. By twisting all the removal members 30, the removal members 30 and the support members 20 are removed from the metal member 10. Thus, the metal member 10 is manufactured.

According to the manufacturing method of the metal member 10 of the present embodiment, by twisting the removal members 30, the removal members 30 and the support members 20 are removed from the removal members 30, the support members 20, and the metal member 10 that are formed integrally with each other. Here, the removal member 30 is a columnar solid member, and includes the uneven structure formed on the bottom face 33 or the side face 37 of the body portion 30a, and the wing portion 32 formed so as to project toward vertically upper side from the top face of the body portion 30a. At the time of removing the support members 20, the torsional force is applied to the removal member 30 from outside through the uneven structure, so that the torsional force is transmitted to the support members 20 via the wing portion 32. Accordingly, by twisting the removal members 30, the removal members 30 and the support members 20 can be easily separated and removed.

The wing portion 32 is provided in the removal member 30. Hereby, the torsional force applied to the removal member 30 from outside through the uneven structure is transmitted to the side faces of the support members 20 from the side face of the wing portion 32. The wing portion 32 has a shape having a large contact area with the support member 20 in the direction perpendicular to the direction of the torsional force. This causes a bonding force between the removal member 30 and the support member 20 to be larger than a bonding force between the support member 20 and the metal member 10. Otherwise, a force (twist, bending moment) transmitted from the removal member 30 is absorbed by deformation of the support member 20, so that a force to work on the boundary surface between the metal member 10 and the support member 20 decreases. As a result, the removal member 30 comes off from the support member 20 from a boundary surface therebetween.

Figure 6:
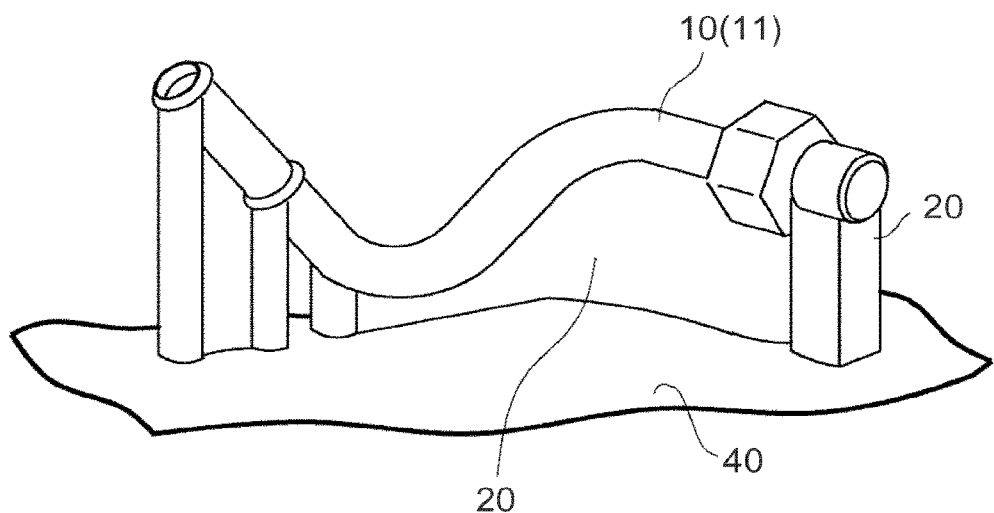
FIG. 6 is a perspective view exemplifying support members 20 and a metal member 10 in a manufacturing method of a metal member according to a comparative example.

FIG. 6 is a perspective view exemplifying support members 20 and a metal member 10 in a manufacturing method of a metal member according to a comparative example. As illustrated in FIG. 6, in the comparative example, the removal members 30 are not provided. In view of this, as a removal method of support members 20 in the comparative example, the following methods are conceivable, for example. That is, (a) the support members 20 are removed by water jet; (b) the support members 20 are removed by electric field grinding; (c) the support members 20 are removed by beating and crushing with a graver; and (d) the support members 20 are cut and removed by machining.

However, the method (a) of the comparative example requires a high running cost in addition to a processor itself being expensive. Further, a cutting thickness has a limit (several centimeters), and it is difficult to form small parts. Besides, it takes a long time for cutting. Further, there is such a problem that rust occurs in the metal member due to moisture content. In the method of (b) of the comparative example, an environmental load is large due to waste water of an electrolytic solution and a sludge process, which increases a cost. In the method of (c) of the comparative example, a work load to an operator increases. Further, by beating with the graver, unsintered metal powder is scattered. Accordingly, it is necessary to perform a treatment to reduce the influence of such dust. In the method of (d) of the comparative example, the machining itself is expensive. As described above, in the comparative example, it is difficult to easily separate and remove the support members 20.

On the other hand, in the present embodiment, the removal members 30 are twisted so that the removal members 30 and the support members 20 are removed from the removal members 30, the support members 20, and the metal member 10 that are formed integrally with each other. This makes it possible to cut the cost and reduce the environmental load in addition to the afore-mentioned effects. Further, it is possible to easily perform the removal by twisting and to restrain the occurrence of dust.

(Modification 1) Next will be described Modification 1. In Modification 1, a body portion 30a of a removal member 30 is formed as a rectangular column instead of a cylinder. Further, support members 20 are formed between a pedestal 40 and removal members 30.

Figure 7A:
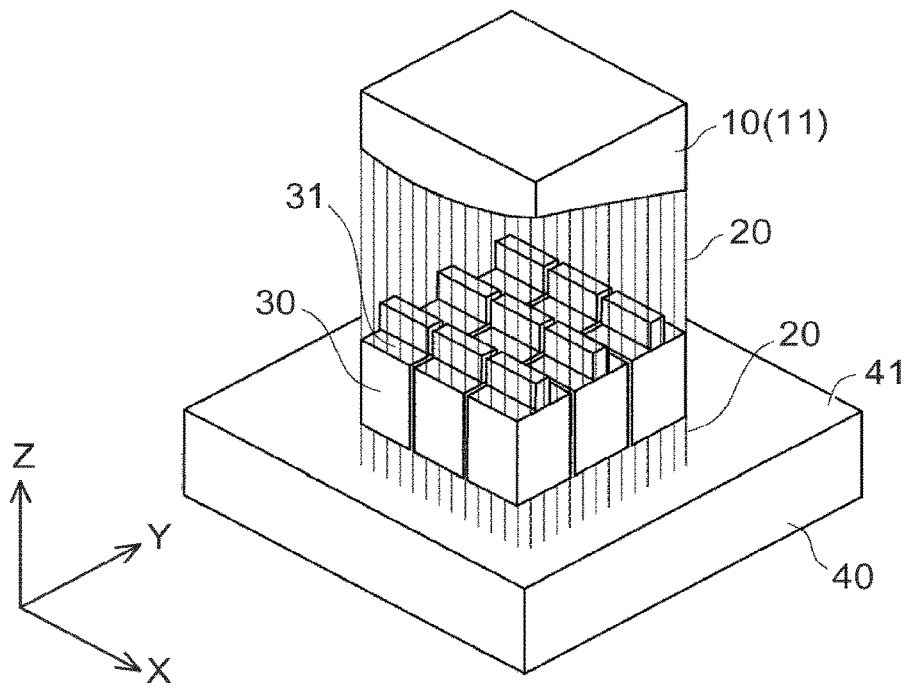
FIG. 7A is a perspective view exemplifying removal members, support members, and a metal member according to Modification 1 of the embodiment.
Figure 7B:
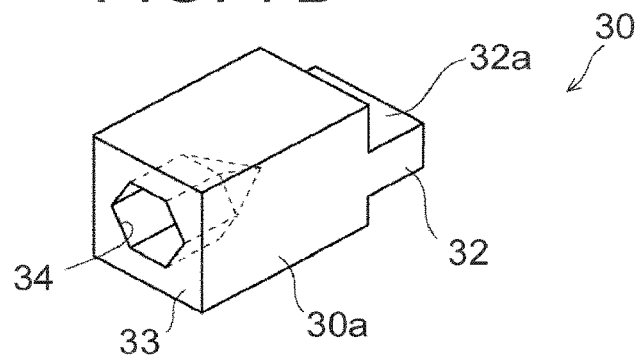
FIG. 7B is a perspective view exemplifying the removal member according to Modification 1 of the embodiment.

FIG. 7A is a perspective view exemplifying removal members, support members, and a metal member according to Modification 1 of the embodiment; FIG. 7B is a perspective view exemplifying the removal member; and FIG. 7C is a view of the removal members separated from the pedestal, when viewed from a vertically lower side.

Figure 7C:
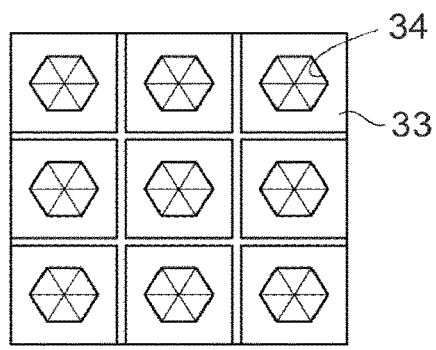
FIG. 7C is a view of the removal members separated from a pedestal and viewed from a vertically lower side, according to Modification 1 of the embodiment.

As illustrated in FIGS. 7A to 7C, the body portion 30a of the removal member 30 has a rectangular-column shape, e.g., a square-column shape, for example. A top face 31 of the body portion 30a has a square shape. A wing portion 32 is constituted by one plate-shaped body 32a having a width of the same length as one side of the top face 31 and having a predetermined height and a predetermined thickness. The plate-shaped body 32a passes through a center of the top face 31 so as to be placed along one direction, e.g., the X-direction. A recessed portion 34 is formed on a bottom face 33 of the body portion 30a of the removal member 30. The recessed portion 34 has a structure similar to that of the embodiment.

In Modification 1, the body portion 30a of the removal member 30 is a square column. The removal members 30 are placed in a matrix form along the X-direction and the Y-direction. The removal members 30 are formed on the support members 20 formed on the pedestal 40. Such a configuration is formed by the following formation method. That is, the support members 20 are formed on the pedestal 40 before the removal members 30 are provided on the pedestal 40. After that, the removal members 30 are formed on the support members 20 thus formed on the pedestal 40. As such, the configuration illustrated in FIG. 7A is formed. After that, the removal members 30, the support members 20, and the metal member 10 that are formed integrally with each other are separated from the pedestal 40. By forming the support members 20 between the removal members 30 and the pedestal 40, it is possible to easily separate, from the pedestal 40, the removal members 30, the support members 20, and the metal member 10 that are formed integrally with each other.

(Modification 2) Next will be described Modification 2. In Modification 2, a recessed portion 34 is not formed on a bottom face 33 of a body portion 30a of a removal member 30, but the recessed portion 34 is formed on a side face 37 of the body portion 30a.

Figure 8A:
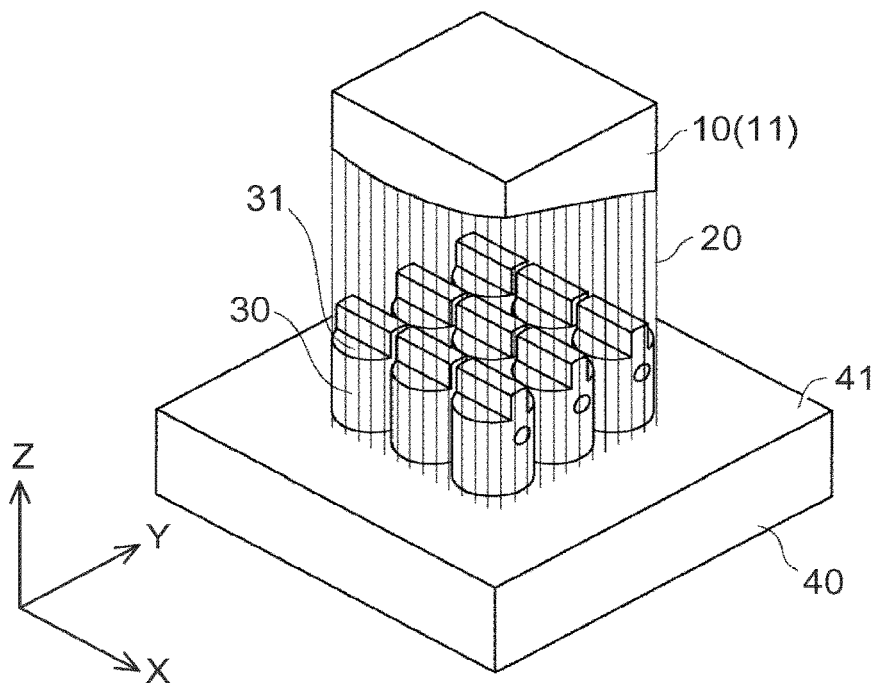
FIG. 8A is a perspective view exemplifying removal members, support members, and a metal member according to Modification 2 of the embodiment.
Figure 8B:
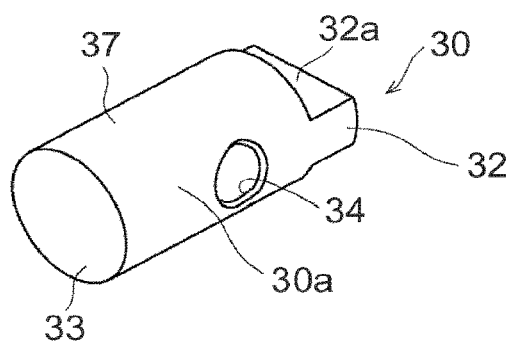
FIG. 8B is a perspective view exemplifying the removal member according to Modification 2 of the embodiment.

FIG. 8A is a perspective view exemplifying removal members, support members, and a metal member according to Modification 2 of the embodiment; FIG. 8B is a perspective view exemplifying the removal member; and FIG. 8C is a view of the removal members separated from a pedestal, when viewed from a vertically lower side.

Figure 8C:
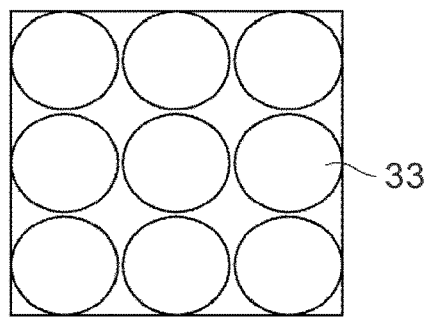
FIG. 8C is a view of the removal members separated from a pedestal and viewed from a vertically lower side, according to Modification 2 of the embodiment.

As illustrated in FIGS. 8A to 8C, the body portion 30a of the removal member 30 has a cylindrical shape, for example. A top face 31 of the body portion 30a has a circular shape. A wing portion 32 is constituted by one plate-shaped body 32a having a width of the same length as a diameter of the top face 31 and having a predetermined height and a predetermined thickness. The plate-shaped body 32a passes through a center of the top face 31 so as to be placed along one direction, e.g., the X-direction. The recessed portion 34 is not formed on the bottom face 33 of the body portion 30a of the removal member 30. A uneven structure of the removal member 30 is the recessed portion 34 formed on the side face 37 of the body portion 30a. An inner surface of the recessed portion 34 is formed so as to have an angle of 45° or more with respect to a horizontal plane so as not to overhang. By forming the recessed portion 34 on the side face of the removal member 30, it is possible to twist the removal members 30 without separating, from the pedestal 40, the metal member 10, the support members 20, and the removal members 30 that are formed integrally with each other.

(Modification 3) Next will be described Modification 3. In Modification 3, one wing portion 32 is provided in a removal member 30.

Figure 9A:
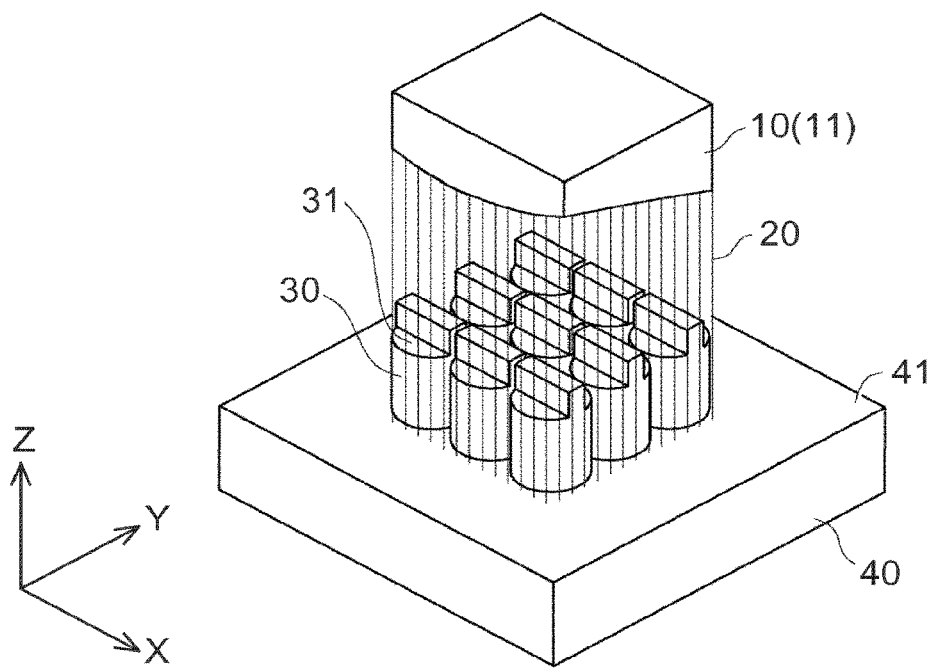
FIG. 9A is a perspective view exemplifying removal members, support members, and a metal member according to Modification 3 of the embodiment.
Figure 9B:
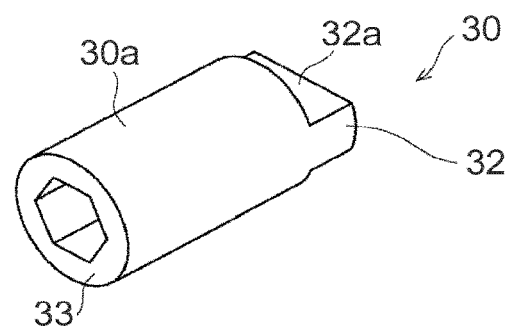
FIG. 9B is a perspective view exemplifying the removal member according to Modification 3 of the embodiment.

FIG. 9A is a perspective view exemplifying removal members, support members, and a metal member according to Modification 3 of the embodiment; FIG. 9B is a perspective view exemplifying the removal member; and FIG. 9C is a view of the removal members separated from a pedestal, when viewed from a vertically lower side.

Figure 9C:
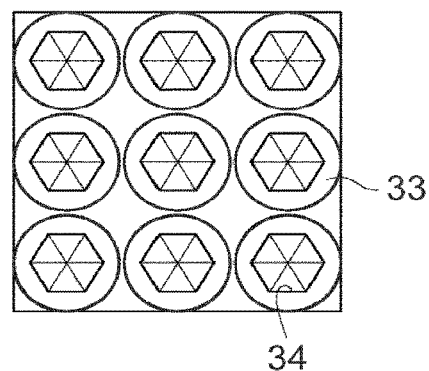
FIG. 9C is a view of the removal members separated from a pedestal and viewed from a vertically lower side, according to Modification 3 of the embodiment.

As illustrated in FIGS. 9A to 9C, a body portion 30a of the removal member 30 has a cylindrical shape. A top face 31 of the body portion 30a has a circular shape. A wing portion 32 is constituted by one plate-shaped body 32a having a width of the same length as a diameter of the top face 31 and having a predetermined height and a predetermined thickness. The plate-shaped body 32a passes through a center of the top face 31 so as to be placed along one direction, e.g., the X-direction. A recessed portion 34 is formed on a bottom face 33 of the body portion 30a of the removal member 30. The recessed portion 34 has a structure similar to that of the embodiment. The removal members 30 are placed in a matrix form in the X-direction and the Y-direction.

(Modification 4) Next will be described Modification 4. In Modification 4, removal members 30 are provided so as to be embedded in a pedestal 40.

Figure 10A:
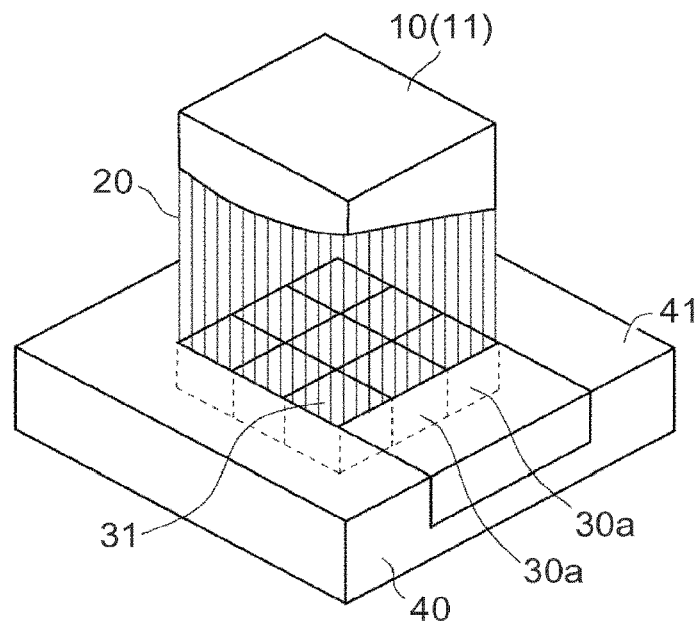
FIG. 10A is a perspective view exemplifying removal members, support members, and a metal member according to Modification 4 of the embodiment.
Figure 10B:
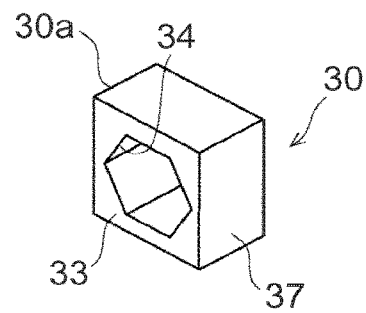
FIG. 10B is a perspective view exemplifying the removal member according to Modification 4 of the embodiment.

FIG. 10A is a perspective view exemplifying removal members, support members, and a metal member according to Modification 4 of the embodiment; FIG. 10B is a perspective view exemplifying the removal member; and FIG. 10C is an enlarged view exemplifying a boundary surface between the metal member and the support members.

As illustrated in FIG. 10A, at the time of providing the removal members 30 on the pedestal 40, body portions 30a of the removal members 30 formed in advance are embedded in a groove formed in the pedestal 40 so as to be fixed thereto. The body portion 30a of the removal member 30 has a square-column shape. The support members 20 are formed integrally with wing portions 32 (not shown) on top faces 31 of the removal members 30. A square groove, viewed from a vertically upper side, is formed in the pedestal 40. A plurality of removal members 30 is arranged in a matrix form and embedded in the groove thus formed in the pedestal 40. With such a configuration, an operation of removing the removal members 30 from the pedestal 40 by use of a band saw can be omitted. As illustrated in FIG. 10B, a recessed portion 34 is formed on a bottom face 33 of the removal member 30. The recessed portion 34 has a structure similar to that of the embodiment.

Figure 10C:
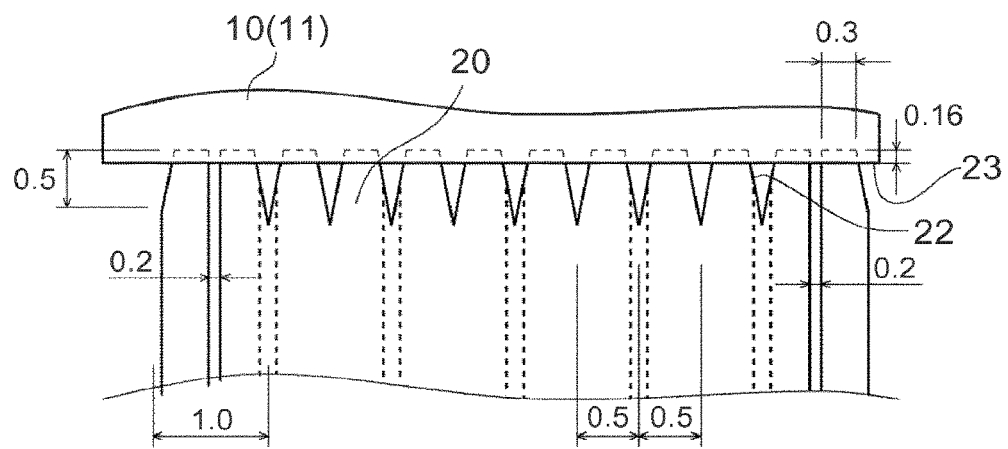
FIG. 10C is an enlarged view exemplifying a boundary surface between the metal member and the support members according to Modification 4 of the embodiment.

Further, in Modification 4, as illustrated in FIG. 10C, at the time of forming the support members 20 integrally, a plurality of notches 22 is formed at predetermined intervals on a boundary surface 23 between the support members 20 and the metal member 10. By forming the notches 22 on the boundary surface 23, a bonding force between the support members 20 and the metal member 10 is lowered as compared with a bonding force between the removal members 30 and the support members 20. Accordingly, by twisting the removal members 30, the removal members 30 and the support members 20 can be easily removed from the removal members 30, the support members 20, and the metal member 10 that are formed integrally with each other.

Figure 11D:
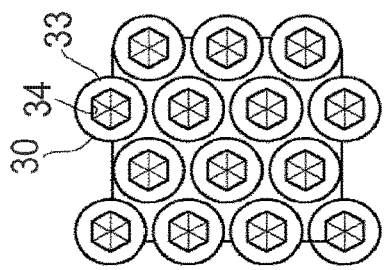
FIG. 11D is a view of the removal members separated from a pedestal and viewed from a vertically lower side, according to Modification 5 of the embodiment.
Figure 11C:
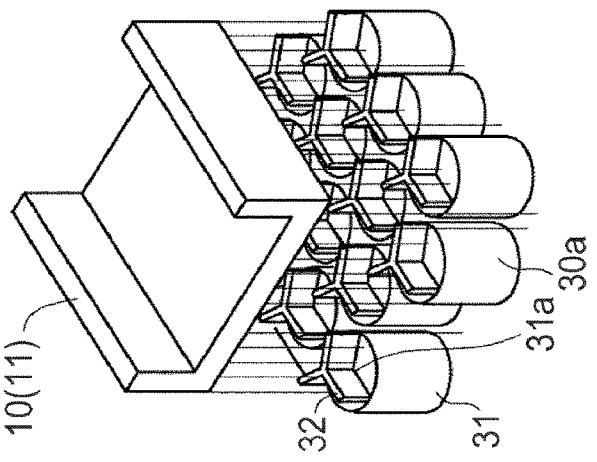
FIG. 11C is a perspective view exemplifying the removal members and the metal member according to Modification 5 of the embodiment.
Figure 11B:
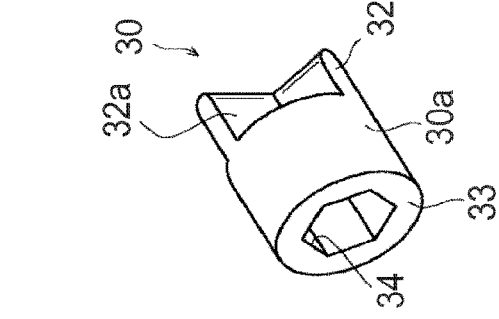
FIG. 11B is a perspective view exemplifying the removal member according to Modification 5 of the embodiment.
Figure 11A:
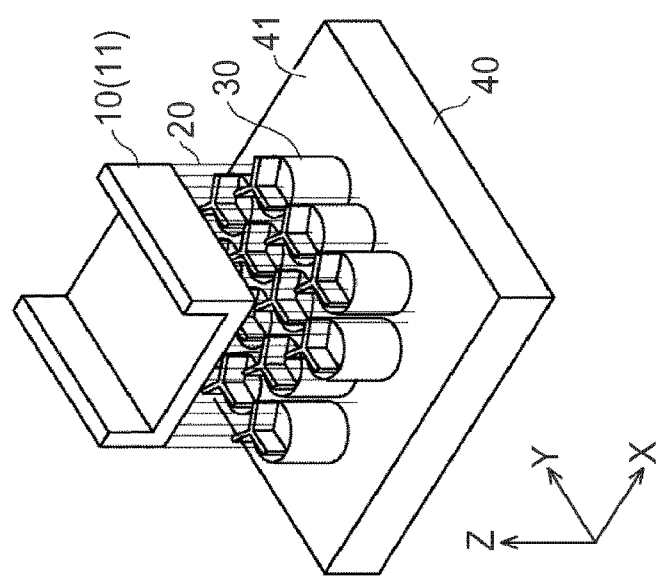
FIG. 11A is a perspective view exemplifying removal members, support members, and a metal member according to Modification 5 of the embodiment.

(Modification 5) Next will be described Modification 5. In Modification 5, a wing portion is formed of three pieces. FIG. 11A is a perspective view exemplifying removal members, support members, and a metal member according to Modification 5 of the embodiment; FIG. 11B is a perspective view exemplifying the removal member; FIG. 11C is a perspective view exemplifying the removal members and the metal member according to Modification 5 of the embodiment; and FIG. 11D is a view of the removal members separated from a pedestal, when viewed from a vertically lower side.

As illustrated in FIGS. 11A to 11D, a body portion 30a of the removal member 30 has a cylindrical shape. A wing portion 32 is constituted by three plate-shaped bodies 32a having a width of the same length as a radius of a top face 31 and having a predetermined height and a predetermined thickness. One ends of the plate-shaped bodies 32a are placed on a center 31a of the top face 31 so that the plate-shaped bodies 32a are arranged radially, when viewed from a vertically upper side. Further, the plate-shaped bodies 32a are placed so that an angle formed between adjacent plate-shaped bodies 32a is 120°. A recessed portion 34 is formed on a bottom face 33 of the body portion 30a of the removal member 30. The recessed portion 34 has a structure similar to that of the embodiment. When a plurality of removal members 30 is viewed from the vertically lower side, the removal members 30 are arranged in the same manner as the embodiment. Note that the number of plate-shaped bodies 32a is not particularly limited. For example, six plate-shaped bodies 32a may be placed radially so that an angle between adjacent plate-shaped bodies 32a is 60°.

Figure 12:
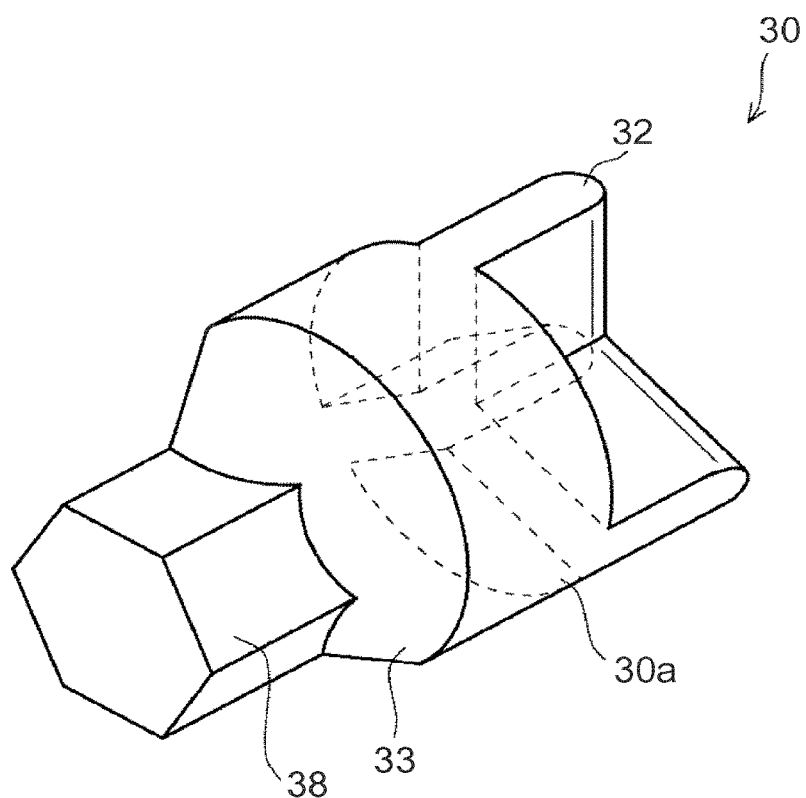
FIG. 12 is a perspective view exemplifying a removal member according to Modification 6 of the embodiment.

(Modification 6) Next will be described Modification 6. In Modification 6, a projection portion is formed on a bottom face 33 of a body portion 30a of a removal member 30. FIG. 12 is a perspective view exemplifying the removal member according to Modification 6 of the embodiment.

As illustrated in FIG. 12, the body portion 30a of the removal member 30 has a cylindrical shape. A wing portion 32 has a structure similar to that of Modification 5. The removal member 30 has an uneven structure formed on the bottom face 33 of the body portion 30a. The uneven structure is a projection portion 38 having a hexagonal-column shape and formed on the bottom face. When the projection portion 38 is viewed from a vertically lower side, a shape of the projection portion 38 is a hexagonal shape. The bottom face 33 except the projection portion 38 is formed so that an angle formed with respect to a horizontal plane is 45° or more. In the present modification, a torsional force is applied by sandwiching the projection portion 38 with a spanner or the like. With such a configuration, it is possible to increase options about a method for transmitting the torsional force.

(Modification 7) Next will be described Modification 7. In Modification 7, removal members 30 are arranged diagonally relative to edges of a metal member 10, when viewed from a vertically upper side.

Figure 13D:
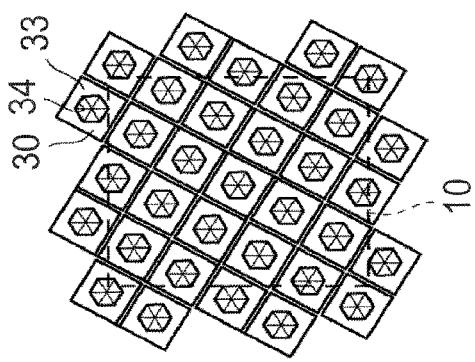
FIG. 13D is a view of the removal members separated from a pedestal and viewed from a vertically lower side, according to Modification 7 of the embodiment.
Figure 13C:
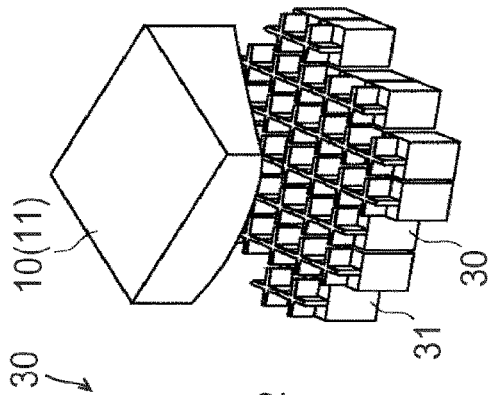
FIG. 13C is a perspective view exemplifying the removal members and the metal member according to Modification 7 of the embodiment.
Figure 13B:
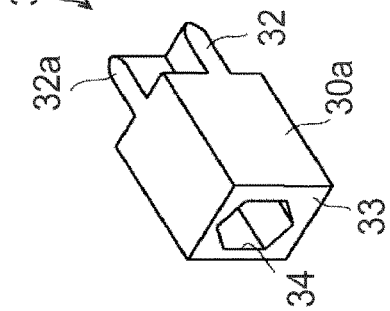
FIG. 13B is a perspective view exemplifying the removal member according to Modification 7 of the embodiment.
Figure 13A:
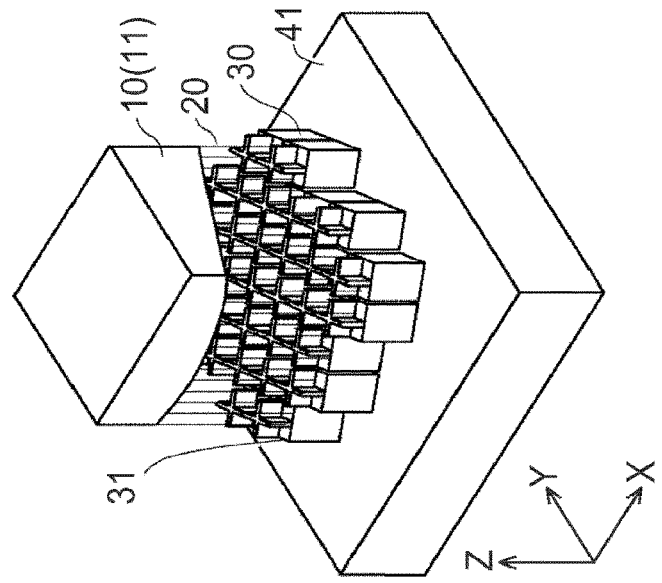
FIG. 13A is a perspective view exemplifying removal members, support members, and a metal member according to Modification 7 of the embodiment.

FIG. 13A is a perspective view exemplifying removal members, support members, and a metal member according to Modification 7 of the embodiment; FIG. 13B is a perspective view exemplifying the removal member; FIG. 13C is a perspective view exemplifying the removal members and the metal member according to Modification 7 of the embodiment; and FIG. 13D is a view of the removal members separated from a pedestal, when viewed from a vertically lower side.

As illustrated in FIGS. 13A to 13D, a body portion 30a of the removal member 30 has a square-column shape. A wing portion 32 is constituted by a plurality of, e.g., four plate-shaped bodies 32a having a width of the same length as half of one side of a square top face 31 and having a predetermined height and a predetermined thickness. Further, one ends of the plate-shaped bodies 32a are placed on a center 31a of the top face 31 so that the plate-shaped bodies 32a are arranged radially, that is, in a cross shape when viewed from the vertically upper side. Further, the plate-shaped bodies 32a are placed so that an angle formed between adjacent plate-shaped bodies 32a is 90°. A recessed portion 34 has a structure similar to that of the embodiment. A plurality of removal members 30 is arranged in a matrix form. However, as illustrated in FIG. 13D, the removal members 30 are arranged diagonally relative to the edges of the metal member 10, when viewed from the vertically lower side.

(Modification 8) Next will be described Modification 8. In Modification 8, a wing portion 32 of a removal member 30 has a recessed shape. FIG. 14A is a perspective view exemplifying removal members, support members, and a metal member according to Modification 8 of the embodiment; FIG. 14B is a perspective view exemplifying the removal member; FIG. 14C is a perspective view exemplifying the removal members and the metal member according to Modification 8 of the embodiment; and FIG. 14D is a view of the removal members separated from a pedestal, when viewed from a vertically lower side.

As illustrated in FIGS. 14A to 14D, a body portion 30a of the removal member 30 has a square-column shape. The wing portion 32 is constituted by four plate-shaped bodies 32a having a width of the same length as one side of a square top face 31 and having a predetermined height and a predetermined thickness. Further, the four plate-shaped bodies 32a are connected along edges of the top face 31 of the body portion 30a in a box shape. A recessed portion 51 is formed in a central part of the wing portion 32. A recessed portion 34 is formed on a bottom face 33 of the body portion 30a of the removal member 30. The recessed portion 34 has a structure similar to that of the embodiment. When a plurality of removal members 30 is viewed from the vertically lower side, the removal members 30 are arranged in the same manner as Modification 1.

(Modification 9) Next will be described Modification 9. In Modification 9, a body portion 30a of a removal member 30 is formed in a shape of a hexagonal column. In the hexagonal column, a corner part formed between adjacent side faces is formed in an R-shape (a round shape).

Figure 15:
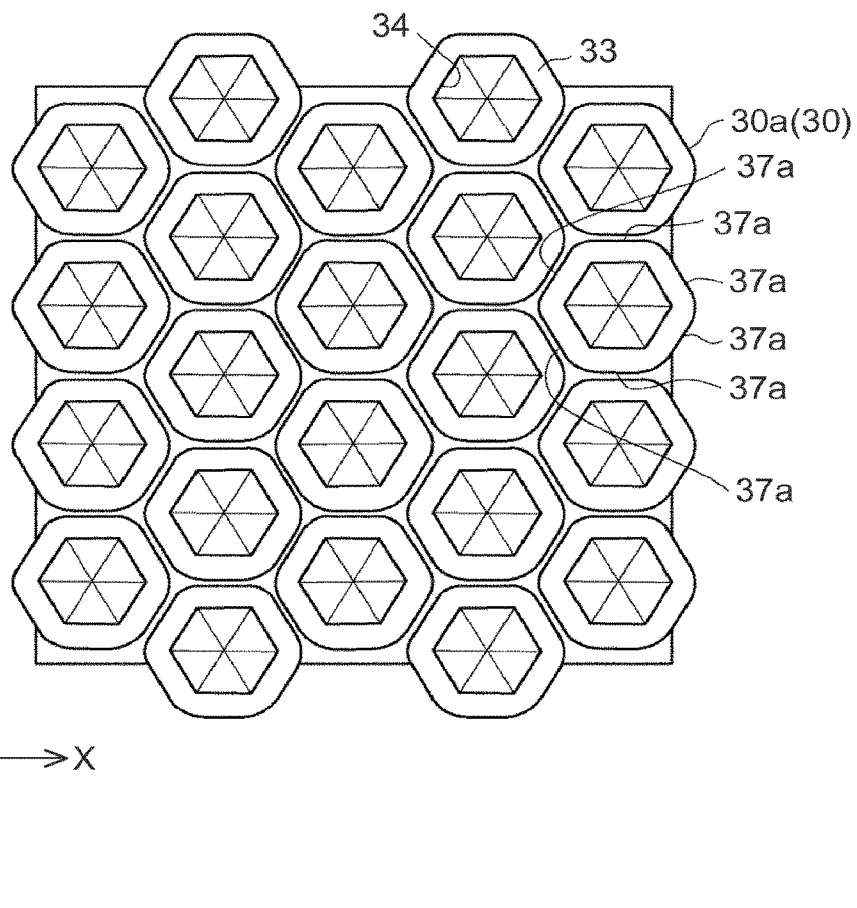
FIG. 15 is a view of removal members according to Modification 9 of the embodiment, when viewed from a vertically lower side after the removal members are separated from a pedestal.

FIG. 15 is a view of removal members according to Modification 9 of the embodiment, when viewed from a vertically lower side after the removal members are separated from a pedestal. As illustrated in FIG. 15, the body portion 30a of the removal member 30 has a shape of a hexagonal column. In the hexagonal column, a corner part formed between adjacent side faces is formed in an R-shape (a round shape). A recessed portion 34 is formed on a bottom face 33 of the body portion 30a. The recessed portion 34 has a hexagonal shape, when viewed from the vertically lower side. An inside of the recessed portion 34 has a structure similar to that of the embodiment. When a plurality of removal members 30 is viewed from the vertically lower side, the removal members 30 are placed in a staggered manner. That is, each of six side faces 37a of the body portion 30a is placed so as to be opposed to a side face 37a of a corresponding one of its adjacent body portions 30a. Hereby, when the plurality of removal members 30 is viewed from the vertically lower side, three bottom faces 33 adjacent to each other are arranged so as to be placed at three corners of an equilateral triangle. That is, the bottom faces 33 are arranged in a direction along the Y-axis and in a direction inclined by 30° from the X-axis.

The embodiment of the manufacturing method of the metal member according to the present invention has been described above, but the present invention is not limited to the above configuration, and the above embodiment can be modified without departing from a technical idea of the present invention.

For example, the bottom face 33 and the side face 37 of the body portion 30a of the removal member 30 both may have the uneven structure. Further, the shapes of the wing portions 32 and the shapes of the recessed portions 34 of the removal members 30 may be selected appropriately and used in combination.

What is claimed is:

1. A manufacturing method for manufacturing a metal member such that the metal member having an overhang portion is molded together with hollow support members that support the overhang portion, by repeatedly forming a molded layer selectively melted and solidified by applying a light beam to a predetermined region of a metal powder layer spread over a pedestal, the manufacturing method comprising:

providing removal members on the pedestal, the removal members being used for removing the support members;

integrally forming the support members on the removal members provided on the pedestal;

integrally forming the metal member on the support members formed integrally with the removal members; and removing the removal members and the support members, by twisting the removal members, from the removal members, the support members, and the metal member that are formed integrally with each other, wherein:

the removal members each include a body portion as a columnar solid member, a uneven structure formed on a bottom face or a side face of the body portion, and a wing portion formed so as to project toward a vertically upper side from a top face of the body portion;

at the time of removing the support members, a torsional force applied to the removal member from outside through the uneven structure is transmitted to a side face of the support member from a side face of the wing portion; and at the time of integrally forming the support members, the support members are formed as hollow rectangular columns extending toward the vertically upper side, and a plurality of support members is formed integrally and arranged so as to form a square honeycomb structure.

2. The manufacturing method of the metal member, according to claim 1, wherein at the time of providing the removal members on the pedestal, a plurality of removal members is provided; and at the time of removing the support members, the removal members are twisted sequentially in a spiral shape, when the plurality of removal members is viewed from a vertically lower side.

3. The manufacturing method of the metal member, according to claim 1, wherein:

the removal member has a cylindrical shape;

the wing portion is constituted by a plurality of plate-shaped bodies having a width of the same length as a radius of the top face and having a predetermined height and a predetermined thickness; and one ends of the plate-shaped bodies are placed on a center of the top face so that the plate-shaped bodies are arranged radially, when viewed from the vertically upper side.

4. The manufacturing method of the metal member, according to claim 3, wherein the uneven structure is a projection portion formed on the bottom face of the body portion.

5. The manufacturing method of the metal member, according to claim 1, wherein the body portion of the removal member has a cylindrical shape;

the wing portion is constituted by one plate-shaped body having a width of the same length as a diameter of the top face and having a predetermined height and a predetermined thickness; and the plate-shaped body is placed along one direction passing through a center of the top face.

6. The manufacturing method of the metal member, according to claim 5, wherein the uneven structure is a recessed portion formed on the side face of the body portion.

7. The manufacturing method of the metal member, according to claim 1, wherein the body portion of the removal member has a square-column shape;

the wing portion is constituted by a plurality of plate-shaped bodies having a width of the same length as half of one side of a square top face of the body portion and having a predetermined height and a predetermined thickness;

one ends of the plate-shaped bodies are placed on a center of the top face so that the plate-shaped bodies are arranged radially, when viewed from the vertically upper side;

the plate-shaped bodies are placed such that an angle formed between adjacent plate-shaped bodies is 90°;

a plurality of removal members is arranged in a matrix form; and the removal members are arranged diagonally relative to edges of the metal member, when viewed from a vertically lower side.

8. The manufacturing method of the metal member, according to claim 1, wherein:

the body portion of the removal member has a square-column shape;

the wing portion is constituted by four plate-shaped bodies having a width of the same length as one side of a square top face of the body portion and having a predetermined height and a predetermined thickness; and the four plate-shaped bodies are connected along edges of the top face of the body portion in a box shape.

9. The manufacturing method of the metal member, according to claim 1, wherein:

the body portion of the removal member has a shape of a hexagonal column;

in the hexagonal column, a corner part formed between adjacent side faces of the body portion is formed in a round shape; and the removal members are arranged such that each of six side faces of the body portion is opposed to a side face of a corresponding one of body portions adjacent to the body portion.

10. The manufacturing method of the metal member, according to claim 1, wherein
a recessed portion is formed on the bottom face of the body portion of the removal member.

11. The manufacturing method of the metal member, according to claim 1, wherein
a bonding force between the removal members and the support members is greater than a bonding force between the support members and the metal member.

12. A manufacturing method for manufacturing a metal member such that the metal member having an overhang portion is molded together with hollow support members that support the overhang portion, by repeatedly forming a molded layer selectively melted and solidified by applying a light beam to a predetermined region of a metal powder layer spread over a pedestal, the manufacturing method comprising:
providing removal members on the pedestal, the removal members being used for removing the support members;
integrally forming the support members on the removal members provided on the pedestal;
integrally forming the metal member on the support members formed integrally with the removal members; and
removing the removal members and the support members, by twisting the removal members, from the removal members, the support members, and the metal member that are formed integrally with each other, wherein:
the removal members each include a body portion as a columnar solid member, a uneven structure formed on a bottom face or a side face of the body portion, and a wing portion formed so as to project toward a vertically upper side from a top face of the body portion;
at the time of removing the support members, a torsional force applied to the removal member from outside through the uneven structure is transmitted to a side face of the support member from a side face of the wing portion;
the method further comprises forming the support members on the pedestal before providing the removal members on the pedestal; and
at the time of providing the removal members on the pedestal, the removal members are formed on the support members formed on the pedestal.

13. A manufacturing method for manufacturing a metal member such that the metal member having an overhang portion is molded together with hollow support members that support the overhang portion, by repeatedly forming a molded layer selectively melted and solidified by applying a light beam to a predetermined region of a metal powder layer spread over a pedestal, the manufacturing method comprising:
providing removal members on the pedestal, the removal members being used for removing the support members;
integrally forming the support members on the removal members provided on the pedestal;
integrally forming the metal member on the support members formed integrally with the removal members; and
removing the removal members and the support members, by twisting the removal members, from the removal members, the support members, and the metal member that are formed integrally with each other, wherein:
the removal members each include a body portion as a columnar solid member, a uneven structure formed on a bottom face or a side face of the body portion, and a wing portion formed so as to project toward a vertically upper side from a top face of the body portion;
at the time of removing the support members, a torsional force applied to the removal member from outside through the uneven structure is transmitted to a side face of the support member from a side face of the wing portion;
at the time of providing the removal members on the pedestal, the body portions of the removal members formed in advance are embedded and fixed in a groove formed in the pedestal; and
at the time of integrally forming the support members, the support members are formed integrally with the wing portions.

* * * * *